Patented Feb. 7, 1928.

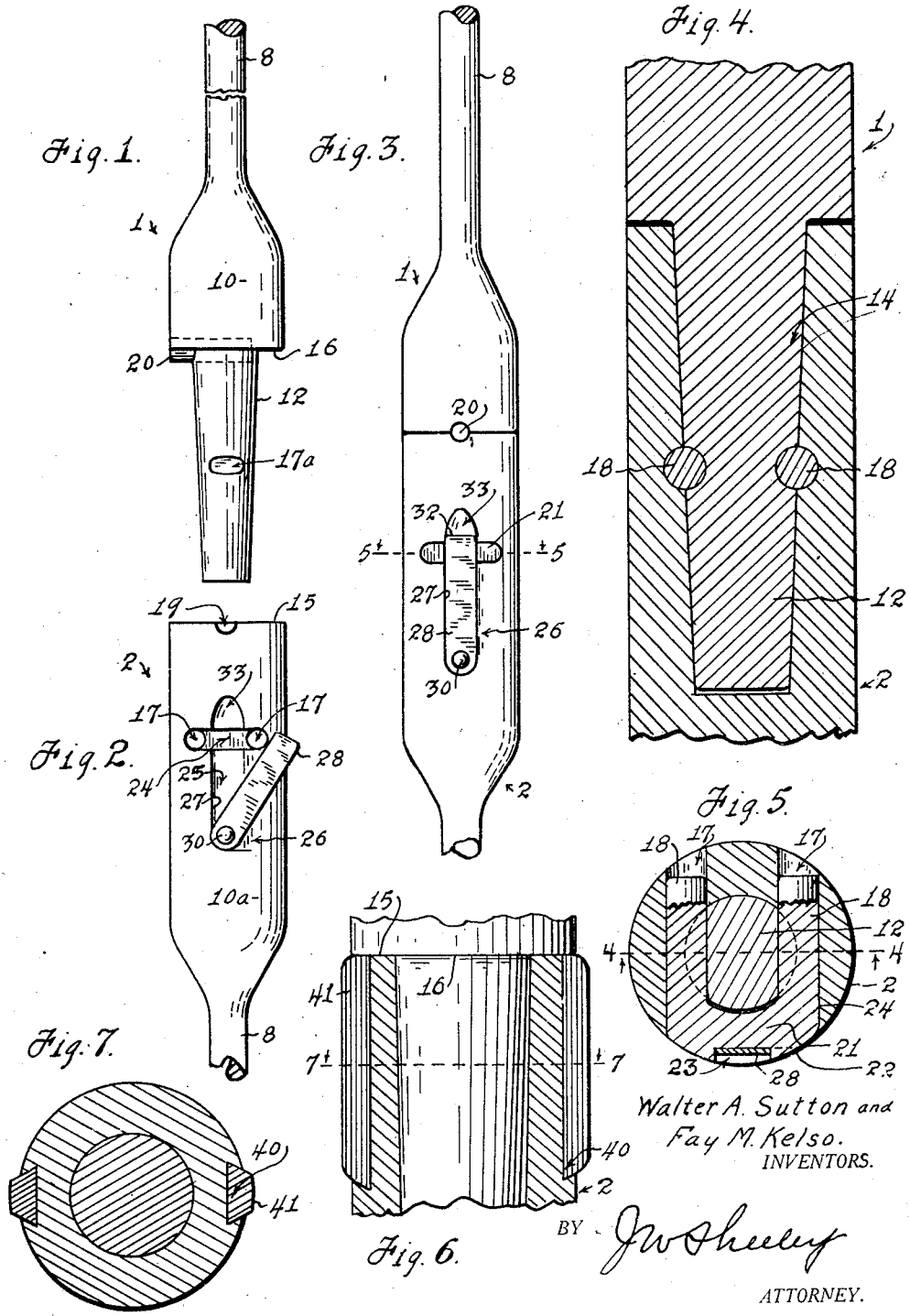
Feb. 7, 1928.
W. A. SUTTON ET AL
SUCKER ROD COUPLING
Filed March 16, 1926
1,658,264
Walter A. Sutton and
Fay M. Kelso.
INVENTORS.
BY J. W. Sheeley
ATTORNEY.

1,658,264

UNITED STATES PATENT OFFICE.

WALTER A. SUTTON AND FAY M. KELSO, OF OXNARD, CALIFORNIA.

SUCKER-ROD COUPLING.

Application filed March 16, 1926. Serial No. 95,088.

The present invention relates to sucker rods for deep well pumps, and pertains more particularly to sucker rod couplings.

Our invention has for its principal object the provision of a coupling which is used in the coupling and uncoupling of sucker rods.

In the operation of oil wells, particularly at great depths and in wells where the pumps have to be removed or pulled quite frequently, one of the large and objectionable costs of producing oil from pumping wells, is that represented by the time and labor consumed in going in and coming out with the pump, tubing and rods.

It is therefore an object of our invention to provide a strong coupling embodying two parts, each connected to corresponding ends of corresponding rods, which parts may be quickly attached to, or detached from, each other.

Another object of our invention is to dispense with screws, threads and the like, inasmuch as threaded parts are dangerous unless very securely set, and when so set, much time is required to break the joint and unscrew the connected parts.

Another object of the invention is to provide a quick coupling which is capable of carrying loads of many tons, and which is practically precluded from becoming uncoupled accidentally.

Still other objects and advantages of our invention will appear hereinafter.

We have illustrated our invention by the accompanying drawings, in which:

Figure 1 is a view in elevation of one section of a practical embodiment of our invention; this section being known as the pin end.

Figure 2 is a similar view of the other part hereinafter known as the box end.

Figure 3 is a view in elevation showing the parts coupled together.

Figure 4 is a view in section on a line 4—4 of Fig. 5.

Figure 5 is a view in section on a line 5—5 of Fig. 3.

Figure 6 is a fragmentary view of the parts shown in Fig. 4; this view showing the addition of a member hereinafter known as the wearing shoe.

Figure 7 is a view in cross section on a line 7—7 of Fig. 6.

More specifically, in carrying out our invention we employ two coupling sections, such as 1 and 2, respectively, the section 1 being fitted to the lower end of a rod length 8, while section 2 is fitted to the upper end of each rod length. It will be understood that the rods 8 are of considerable length and may be directly welded to the couplings. The manner of securing rods to couplings, and the operation of lowering a long string of rods into a hole by connecting one rod to another, is well understood by those skilled in the art.

The salient feature of our invention resides in the construction of the coupling per se. The pin end section is provided with an enlarged portion 10, preferably of maximum permissible diameter, making allowance for the fact that the portion 10 must be a loose fit in the oil tubing (not shown) to permit the fluid to flow by. From the portion 10 there projects a vertical tapered pin 12 of reduced diameter, as compared to portion 10.

The box end section is likewise provided with an enlarged body $10^a$, of the same diameter, preferably, as portion 10. Each section is of constantly changing reduced diameter toward the rod so that the coupling will readily move by sharp corners or projections which it may encounter in moving through the tubing. The box end section is provided with a tapered bore 14. The upper end of the box end section terminates in a horizontal surface 15, and the pin 12 joins the body of the pin end section at a corresponding flat surface 16. When the sections are fitted together, as shown in Fig. 3, these sections come into abutment and serve to definitely position the pin in the tapered bore.

In the manufacture of this coupling, the box end section and pin end section are assembled in the relation shown in Fig. 3. The two holes 17—17 are drilled parallel to each other through the body of the box end section; the center line of said holes passing parallelly across the outer circumference of the pin. Thus when the pin is again removed it is possessed with two semi-circular slots or depressions $17^a$, cutting away the circumferential margin of the pin at corresponding opposite points.

In order to position the pin correctly in the bore of the box end section, the said section is provided with a semi-circular depression 19 in the top surface thereof. A corresponding depression is formed in the portion 10 of the pin end section, and a dowel pin 20 is permanently set in said depression. In assembling the coupling sections, the dowel pin is caused to seat in the depression 19, thus correctly positioning the pin in the bore.

The two bores 17 are adapted to receive locking pins, such as 18, and preferably said pins are joined to each other by a bridge 21, to provide a complete staple. The outer surface 22 of the bridge is accurately turned to conform to the outer circumference of the body of the sections, and said surface is depressed slightly, as at 23.

The body section 2 is provided with a cavity 24 for the receipt of the bridge 21, so that the bridge does not protrude from the assembled coupling. The circumferential surface of section 2 is milled with a vertical shallow slot 25, which fades into the circumference, as at 26, while terminating in a shoulder 27 at its outer boundary. A spring clip 28 is provided and same is pivoted to the body, as at 30, so that it may be swung from the position in which it is shown in Fig. 2, into the position shown in Fig. 4. In the latter position it holds the staple in place. The upper end of the clip is bent inwardly, as at 32, and is adapted to extend into a depression 33 in the body above the cavity where the staple reposes. When the spring clip is disposed with its bent end in said depression, it cannot be removed without inserting an instrument (not shown) in the depression, and prying the bent end of the clip out of place. Then by swinging the clip into the position in which it is shown in Fig. 2, the staple may be driven out. The holes 17 are drilled entirely through the body so that a punch or the like (not shown) may be employed for quickly driving the staple out of locking position.

It will be apparent that the pin is held in the tapered bore by the staple in such manner that the pin can neither turn, ascend or descend in section 2. Thus during reciprocation of the rods there is no turning or lost motion, and consequently there is no tendency for the holes 17 to become enlarged by wear. If desired, the coupling may be fitted with a second set of holes and a second cavity for the staple, so that any damage occurring to the first set of holes will not render the coupling useless.

All vertical stress to which the rods are subject, as in raising the pump plunger and the oil column, are resolved into a shearing stress on the pins of the staple. These pins are of comparatively great cross sectional area where they key the pin to the body of the box end section.

In making up a string of rods, as in the act of "going in" with the pump plunger, successive rods are connected to each other by inserting the pin end of one into the box end of the other. Each pin end section is centered with regard to the box end section by means of the dowel pin. When properly positioned, with the corresponding surfaces in abutment with each other, the staple is pressed into place. A light tap with a hammer will serve to set the staple, and then the spring clip is swung into place. The parts so assembled will remain so permanently. To uncouple the sections, the spring clip is pried out of the way of the staple. The staple is quickly driven out, and the taper pin can be easily withdrawn from the tapered bore merely by lifting the upper rod length while the lower one is held by gravity. It is advisable to have an appreciable taper to the pin and bore to prevent undue wedging and to permit of their being readily separated.

In Figs. 6 and 7, we have shown the opposite sides of the body 2, where there is ample material, provided with dovetail slots 40. In each slot a brass wearing shoe 41 is fitted. Said shoes serve the purpose of usual removable wearing shoes employed in sucker rod couplings. The shoes are only light press fits in the slots, and said slots are open at the upper ends. The shoes are readily removed or replaced when the member 2 is detached from member 1; but when the coupling members are coupled together, these shoes cannot become dislodged during the reciprocation of the rods in the oil tubing.

While we have shown and described a specific embodiment of our invention, it is to be understood that this illustration is by way of example only, and we do not wish to be limited to any specific construction or arrangement of parts, and we may alter same as we desire without enlarging the scope of our invention as set forth in the appended claims.

We claim:

1. In a coupling of the class described, a vertical elongated coupling member having a body provided with a vertical bore, another coupling member having a body disposed above and in abutment with the upper end of said first named body member, a fixed depending pin carried by other body member; fitted snugly in said bore; the body of the first member and the pin of the second named member jointly providing indentations which when aligned provide through bores jointly penetrating the said body and pin, respectively, locking pins removably driven into said bores, a bridge connecting said locking pins; one of said bodies provided with a cavity for receipt of said bridge, and said bridge being disposed in said cavity.

2. A coupling as in claim 1 and further including a spring clip externally of the body and pressing yieldably against said bridge.

3. In a coupling of the class described, an upper coupling member having a lower plane surface, a lower coupling member having an upper plane surface and vertical dovetail slots intersecting the outer margin of the body and terminating openly at said upper plane surface, correspondingly shaped wearing shoes removably fitted in said slots, and means for locking said coupling sections together with said plane surfaces in abutment with each other whereby said shoes are nonremovable from said slots when the sections are held together by said means.

WALTER A. SUTTON.
FAY M. KELSO.